United States Patent
Wang et al.

(10) Patent No.: US 8,270,596 B2
(45) Date of Patent: Sep. 18, 2012

(54) MUSICAL CALLER ID APPARATUS AND METHOD

(75) Inventors: Chuan-Hong Wang, Taipei Hsien (TW); Li-Zhang Huang, Taipei Hsien (TW); Hsiao-Chung Chou, Taipei Hsien (TW); Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu Cheng, New Taipei (TW)

( * ) Notice: Subject to any disclaimer, the term of this patent is extended or adjusted under 35 U.S.C. 154(b) by 965 days.

(21) Appl. No.: 12/206,741

(22) Filed: Sep. 9, 2008

(65) Prior Publication Data
US 2009/0190733 A1 Jul. 30, 2009

(30) Foreign Application Priority Data
Jan. 25, 2008 (CN) .......................... 2008 1 0065982

(51) Int. Cl.
H04M 1/00 (2006.01)
H04M 3/00 (2006.01)
H04B 1/38 (2006.01)
(52) U.S. Cl. ............... 379/374.01; 379/373.03; 455/567
(58) Field of Classification Search ............. 379/142.06; 84/609
See application file for complete search history.

(56) References Cited

U.S. PATENT DOCUMENTS

| | | | |
|---|---|---|---|
| 7,012,999 B2 | 3/2006 | Ruckart | |
| 2002/0168964 A1* | 11/2002 | Kraft | 455/412 |
| 2003/0152205 A1* | 8/2003 | Winkler | 379/142.06 |
| 2006/0025968 A1* | 2/2006 | Sano | 702/189 |
| 2008/0066609 A1* | 3/2008 | Bourgeois | 84/609 |

FOREIGN PATENT DOCUMENTS

| | | |
|---|---|---|
| CN | 1254431 A | 5/2000 |
| CN | 1434660 A | 8/2003 |
| TW | 495735 | 7/2002 |
| TW | 561449 | 11/2003 |
| TW | I291837 | 12/2007 |

* cited by examiner

*Primary Examiner* — Fan Tsang
*Assistant Examiner* — Jeffrey Lytle
(74) *Attorney, Agent, or Firm* — Altis Law Group, Inc.

(57) ABSTRACT

An incoming call prompting method is provided. The method includes the step of: providing a data storage for storing a note table, a melodic companion table, and an audio clip database; receiving an incoming call and sending the incoming call to a decoder to phone number of the incoming call; storing the phone number in the data storage; obtaining a predetermined digit set from the incoming call phone number stored in the data storage; obtaining the assigned note of each digit of the digit set, and piecing together a melodious sequence of note based upon a pre-determined algorithm guiding selection and sequencing of a combination of the primary notes and/or companion notes of the melodic companion table to edit a melody; and obtaining and outputting audio clip of each note of the edited melody in turn to generate a music.

1 Claim, 3 Drawing Sheets

MUSICAL CALLER ID APPARATUS AND METHOD

BACKGROUND

1. Field of the Invention

The present invention relates to a musical caller ID apparatus and a method for same.

2. Description of Related Art

Portable communication apparatuses, such as cell phones, have become necessary tools in our daily lives. Many functions are available now with our cell phones, such as caller ID. Caller ID allows users to easily screen their calls.

Recently, caller ID functions have been developed that can audibly reveal the phone number and/or other information of a caller by the use of an electronically generated voice so that a user does not even have to look at their phone to know who is calling.

One such caller ID includes a processing unit. The processing unit obtains voice clips, which correspond to digits (0-9) of the numbers of the incoming calls, from an audio clip database, and sends the proper combination and sequence of voice clips to a voice generating chip to be output. The processing unit includes a calling number analysis device, a call number storing device, a voice clip obtaining device, and a voice clip sending device. The calling number obtaining device is for receiving the incoming call, and obtains the calling number from the incoming call. The calling number storing device is for storing the calling number in a storage of the apparatus. The voice clip obtaining device is for obtaining corresponding voice clips from the voice clip database according to the calling number. The voice clip sending device sends the obtained voice clips to the voice generation chip.

However, even though this is a convenient function, when the voice clips are used to announce the number of an incoming call, the sound of the voice clips may not be pleasing to the human ear. Each voice clip is generally comprised of one or more notes which may comprise a chord, but because each digit is only associated with one voice clip, there is no melody to a voiced phone number, it's just a series a tones or chords not musically related to each other.

Therefore, what is needed is a musical caller ID apparatus, which can identify callers using a unique sequence of audio clips of musical tones arranged in a melody.

SUMMARY

A musical caller ID apparatus is provided. The apparatus includes: a data storage for storing a note table, a melodic companion table, and an audio clip database, the note table assigning a primary note for each number (0-9). The melodic companion table associates companion notes for each assigned note, and the audio clip database storing pre-recorded audio clips of each note. Further included are an incoming call receiving module for receiving an incoming call and sending the incoming call to a decoder to obtain the phone number of the incoming call and storing the phone number in the data storage, a digit obtaining module for obtaining a predetermined digit set from the incoming call phone number stored in the data storage; a melody composing module for obtaining the assigned note of each digit of the digit set, and piecing together a melodious sequence of notes based upon a pre-determined algorithm guiding selection and sequencing of a combination of the primary notes and/or companion notes of the melodic companion table; and a music generating module for obtaining and outputting audio clips of each note of the composed melody in turn to generate a music.

Other advantages and novel features will be drawn from the following detailed description of the preferred embodiment with reference to the attached drawings.

BRIEF DESCRIPTION OF THE DRAWINGS

The components of the drawings are not necessarily drawn to scale, the emphasis instead being placed upon clearly illustrating the principles of a musical caller ID apparatus. Moreover, in the drawings, like reference numerals designate corresponding parts throughout several views.

DETAILED DESCRIPTION

Figure 1:
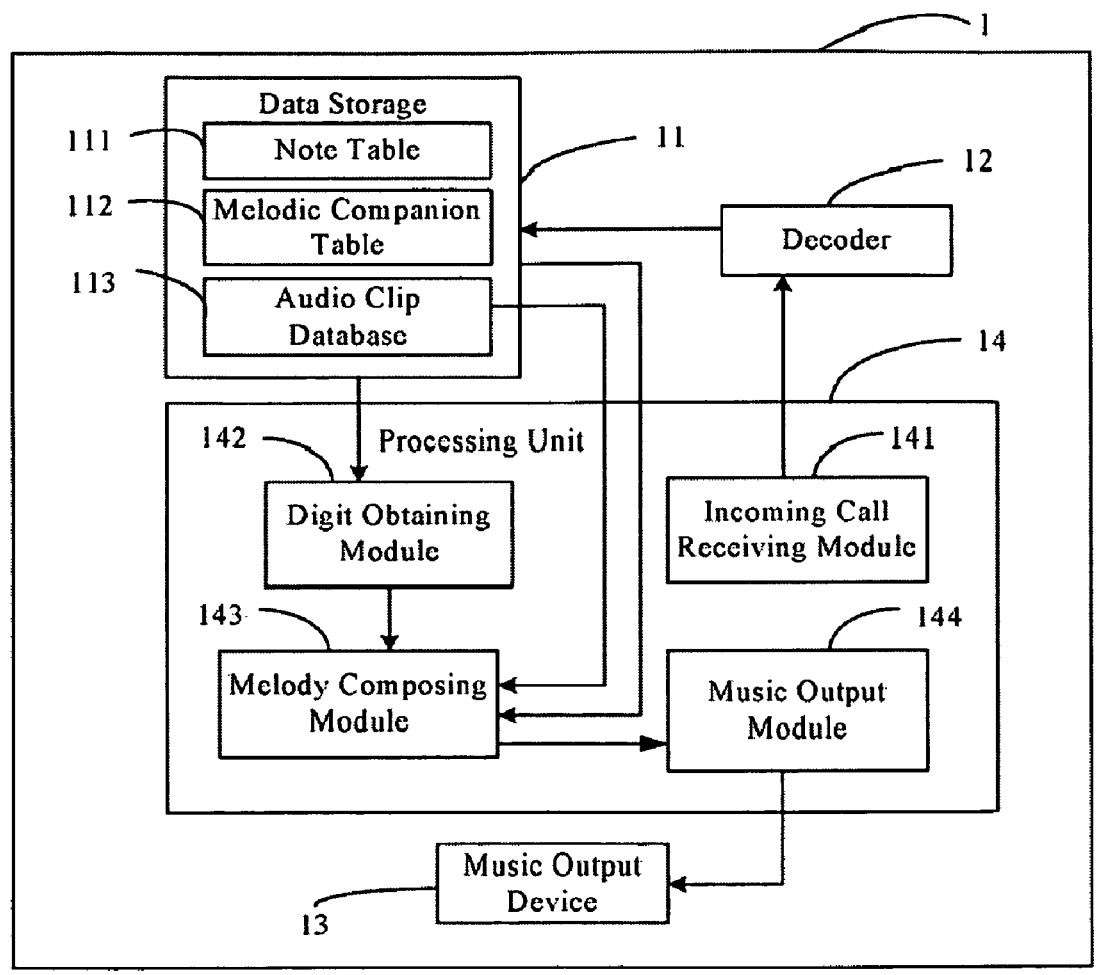
FIG. 1 is an exemplary block diagram of an musical caller ID apparatus in accordance with an exemplary embodiment of the present invention.

FIG. 1 is an exemplary block diagram of a musical caller ID apparatus (hereinafter "the apparatus") in accordance with an exemplary embodiment of the present invention. The apparatus includes a data storage 11, a decoder 12, a music output device 13, and a processing unit 14. The data storage 11 stores a note table 111, a melodic companion table 112, and an audio clip database 113.

The note table 111 assigns a primary note for each digit (0-9), as shown in the following note table.

| Note Table | | | | | | | | | | |
|---|---|---|---|---|---|---|---|---|---|---|
| | Digit | | | | | | | | | |
| | 1 | 2 | 3 | 4 | 5 | 6 | 7 | 8 | 9 | 0 |
| Note | do | re | mi | fa | sol | la | ti | do | re | mi |

The relationship between the digits and the primary notes is not limited to that defined in the note table 111. The relationship can also be defined by the user.

The melodic companion table 112 stores at least one companion note of each primary note listed in the note table 111. When a primary note is played in sequence with either or both of its companion notes, they will sound melodious.

| Melodic Companion table | | | | | | | | | | | | |
|---|---|---|---|---|---|---|---|---|---|---|---|---|
| | Note | | | | | | | | | | | |
| | do | | re | | mi | | fa | | sol | | la | ti |
| Companion Note | re | fa | do | mi | ti | sol | do | ti | mi | la | re | sol | mi | re |

The note table 111 and melodic companion table 112 are based on the 'Just Intonation Music Scale' as an example, but other scales can be used according to manufacturer or user preference. [0018] The audio clip database 113 stores prerecorded audio clips of each note.

The processing unit 14 includes an incoming call receiving module 141, a digit obtaining module 142, a melody composing module 143, and a music output module 144.

The incoming call receiving module 141 is for receiving an incoming call and sending the incoming call to a decoder 12 to obtain its phone number and storing the phone number in the data storage 11.

The digit obtaining module 142 is for obtaining a digit set from the phone number stored in the data storage 11. The digits of the digit set can be all the digits of the phone number, or can be some of the digits of the phone number. For example, suppose the phone number is "13956123846", a user, not wanting a long 11 note melody, may associate an abbreviated digit pattern with the phone number. The digit pattern may, for example, use only the third, sixth, eighth, tenth, and eleventh digits of the phone number, so the digit set is "91346".

Figure 2:
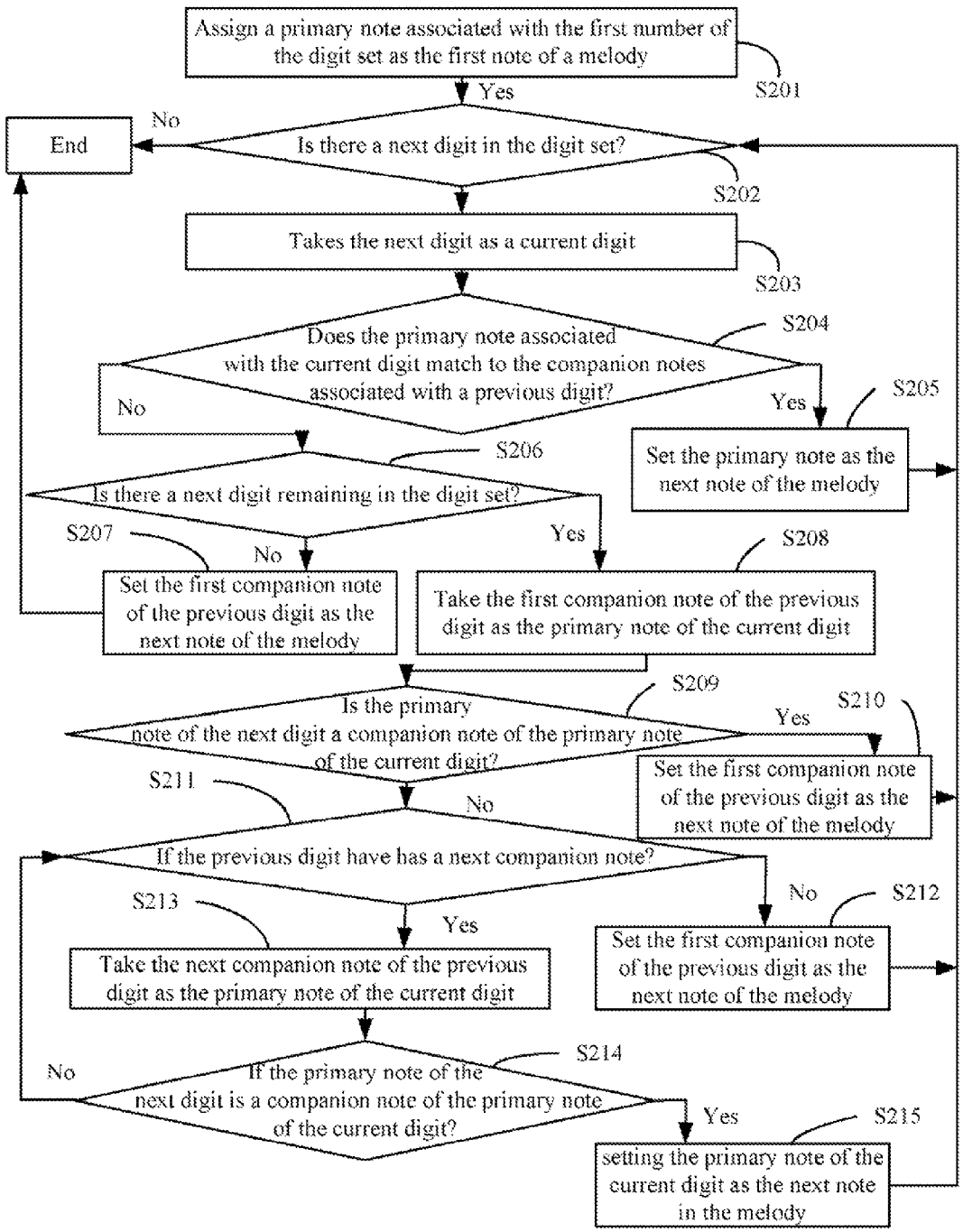
FIG. 2 is a flowchart of a melody composition process.

The melody composing module 143 is for composing a melody according to the digit set. Referring to FIG. 2, a melody composition process includes the following. In step S201, the melody composing module 143 receives a digit set from the digit obtaining module 142 and assigns the primary note associated with the first number of the digit set according to the note table 111, as the first note of a melody to be played for the incoming call associated with the received digit set.

In step S202, the melody composing module 143 checks for a next digit in the digit set. If no next digit, then all digits have been assigned and the composition process ends. If there is a next digit, in step S203, the next digit is taken as the current digit and the process goes to step S204.

In step S204, the melody composing module 143 compares the primary note associated with the current digit to the companion notes associated with the previous digit as listed in the melodic companion table 112. If there is a match, in step S205, the primary note is set as the next note of the melody, and the process returns to step S202. If there is no match then the process goes to step S206.

In step S206, the melody composing module 143 checks for a next digit remaining in the digit set. If there is no next digit remaining in the digit set, in step S207, the first companion note of the previous digit is set as the next note of the melody and the composition process ends. If there is a next digit the process goes to step S208.

In step S208, the first companion note of the previous digit is taken as the primary note of the current digit, and step S209 is next.

In step S209, the melody composing module 143 checks to see if the primary note of the next digit is a companion note of the primary note of the current digit. If yes, in step S210, the primary note of the current digit is set as the next note in the melody and the process returns to step S202. If no, then step S211 is next.

In step S211, the melody composing module 143 checks to see if the previous digit has a next companion note. If no, the process goes to step S212. If yes, the process goes to step S213.

In step S212, the first companion note of the previous digit is set as the next note of the melody.

In step S213, the next companion note of the previous digit is taken as the primary note of the current digit, and step S214 is next.

In step S214, the melody composing module 143 checks to see if the primary note of the next digit is a companion note of the primary note of the current digit. If yes, the process goes to step S215. If no, the process returns to step S207.

In step S215, the primary note of the current digit is set as the next note in the melody and the process returns to step S202.

The digit set "91346" is taken as an example here to illustrate the melody composition process. Firstly, the melody composing module 143 respectively obtains the primary note "re" and "do" of the first digit "9" and the second digit "1" of the figure set in the note table 111. Because the note "do" is the companion note of the note "re", the note need not to adjust and the second digit is taken as current digit. The melody composing module 143 obtains the primary note "mi" of the third digit "3". Because the note "mi" is one companion note of the note "re", the note "mi" need not adjust and the third digit is taken as the current digit. The melody composing module 143 obtains the primary note "fa" of the fourth digit "4" in the note table 111. Because the note "fa" is not companion note of the note "mi", the melody composing module 143 must select one companion note of the note "mi" to replace the note "fa". There are two companion notes, namely "ti" and "so", of the note "mi". Because the note "la" is the primary note of the fifth digit "6" and the "la" is the companion note of the note "so", the "so" is selected to replace the note "fa" and then the fifth digit is taken as current digit. Because the fifth digit is the last digit of the digit set, the melody is finished composing. The composed melody is "re do mi so la".

The music generating module 144 is for obtaining corresponding audio clip of each note of the composed melody in turn from the audio clip database 113 to output through the music output device 13. The output audio clips forms a music.

Figure 3:
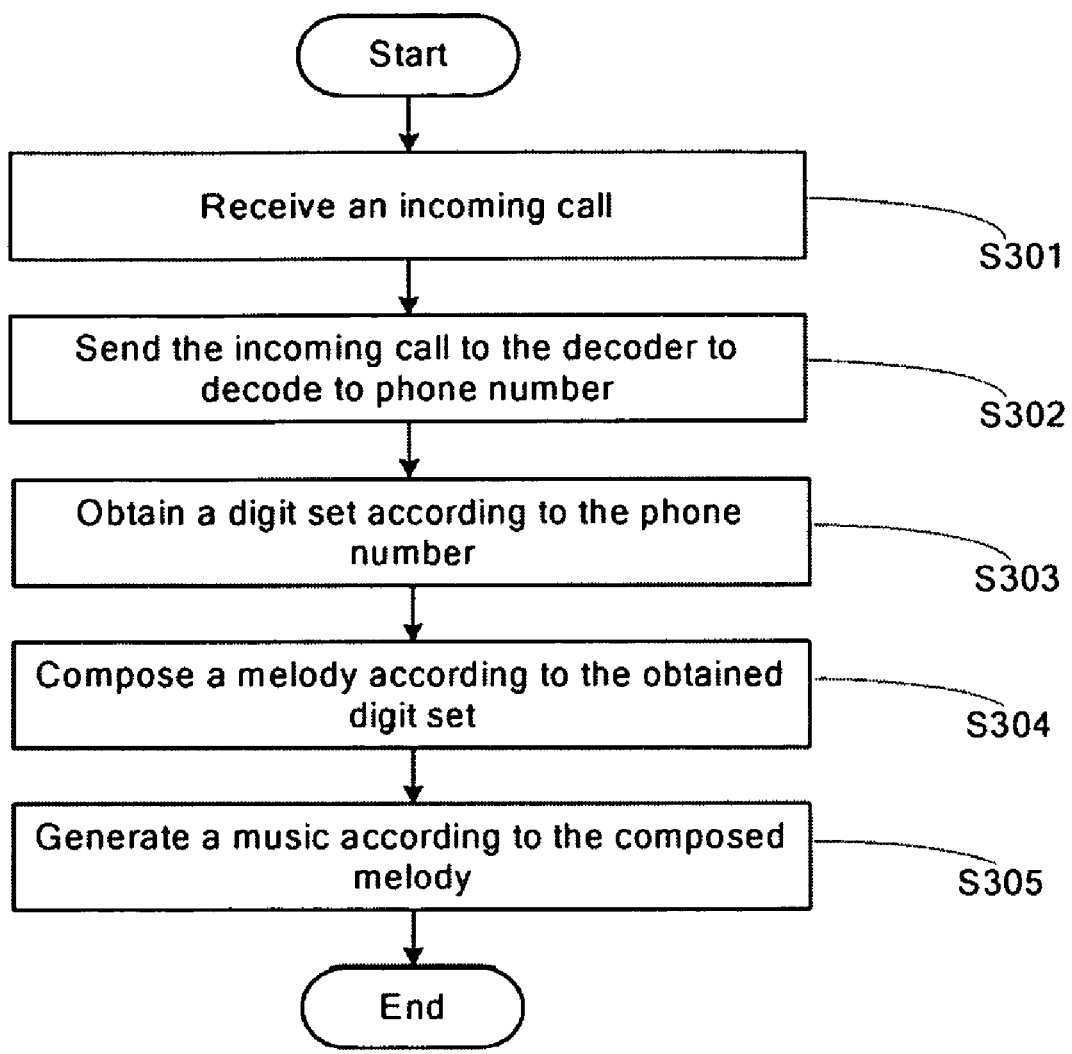
FIG. 3 is a flowchart of an musical caller ID method applied in the apparatus of FIG. 1.

FIG. 3 is a flowchart of an incoming call prompting method applied in the apparatus of FIG. 1. In step S301, the incoming call receiving module 141 receives the incoming call.

In step S302, the incoming call receiving module 141 sends the incoming call to a decoder 12 to decode to phone number and storing the phone number in the data storage 11.

In step S303, the digit obtaining module 142 obtains a digit set according to the phone number stored in the data storage 11.

In step S304, the melody composing module 143 composes a melody according to the obtained digit set as detailed above (see FIG. 2).

In step S305, the music generating module 144 generates a music according to the melody composing module 143.

Although the present invention has been specifically described on the basis of an exemplary embodiment, the invention is not to be construed as being limited thereto. Various changes or modifications may be made to the embodiment without departing from the scope and spirit of the invention.

What is claimed is:

1. An incoming call prompting method, comprising:
providing a data storage for storing a note table, a melodic companion table, and an audio clip database, the note table assigning a primary note for each digit (0-9), the melodic companion table recording at least one companion note of each primary note listed in the note table, and the audio clip database storing pre-recorded audio clips of each note;
receiving an incoming call and sending the incoming call to a decoder to decode to phone number of the incoming call;
storing the phone number in the data storage;
obtaining a predetermined digit set from the incoming call phone number stored in the data storage;
obtaining the assigned note of each digit of the digit set, and piecing together a melodious sequence of note based upon a pre-determined algorithm guiding selection and sequencing of a combination of notes selected from the group consisting of: the primary notes and the companion notes of the melodic companion table to compose a melody; and obtaining and outputting audio clip of each note of the composed melody in turn to generate a music;

wherein the method further comprises a melody composing process, comprising:

a) assigning the primary note associated with a first number of the digit set, as the first note of a melody to be played for the incoming call associated with the received digit set;

b) checking for a next digit in the digit set, and if it is determined that there is not a next digit in the digit set, the melody composing process ends;

c) if it is determined that there is a next digit in the digit set, taking the current digit as a previous digit, taking the next digit as a current digit and comparing the primary note associated with the current digit to the companion notes associated with the previous digit as listed in the melodic companion table;

d) setting the primary note of the current digit as the next note of the melody if the result of the comparison in step c) confirms that there is a match, and the melody composing process returns to step b);

e) checking for a next digit remaining in the digit set, if the result of the comparison in step c) confirms that there is no match;

f) setting the first companion note of the previous digit as the next note of the melody if at step e) it is determined that there is not a next digit remaining in the digit set, and the melody composing process ends;

g) taking the first companion note of the previous digit as the primary note of the current digit if at step e) it is determined that there is a next digit remaining in the digit set;

h) checking to see if the primary note of the next digit is a companion note of the primary note of the current digit;

i) setting the primary note of the current digit as the next note in the melody if the result of the check in step h) confirms that the primary note of the next digit is a companion note of the primary note of the current digit, and the process returns to step b);

j) checking to see if the previous digit has a next companion note if the result of the check in step h) confirms that the primary note of the next digit is not a companion note of the primary note of the current digit;

k) setting the first companion note of the previous digit as the next note of the melody if the result of the check in step j) confirms that the previous digit does not have a next companion note, and the process returns to step b);

l) taking the next companion note of the previous digit as the primary note of the current digit if the result of the check in step j) confirms that the previous digit has a next companion note;

m) checking to see if the primary note of the next digit is a companion note of the primary note of the current digit;

n) setting the primary note of the current digit as the next note in the melody if the result of the check in step m) confirms that the primary note of the next digit is a companion note of the primary note of the current digit and the process returns to step b); and o) the process returning to step j) if the result of the check in step m) confirms that the primary note of the next digit is not a companion note of the primary note of the current digit.

* * * * *